United States Patent
Schad et al.

(10) Patent No.: US 9,333,691 B2
(45) Date of Patent: May 10, 2016

(54) HIGH SPEED CLAMP SYSTEM FOR AN INJECTION MOLDING MACHINE

(71) Applicant: Athena Automation Ltd., Vaughan (CA)

(72) Inventors: Robert D. Schad, Toronto (CA); Carsten Link, Burlington (CA)

(73) Assignee: Athena Automation Ltd., Vaughan (CA)

( * ) Notice: Subject to any disclaimer, the term of this patent is extended or adjusted under 35 U.S.C. 154(b) by 0 days.

(21) Appl. No.: 14/941,209

(22) Filed: Nov. 13, 2015

(65) Prior Publication Data
US 2016/0067898 A1 Mar. 10, 2016

Related U.S. Application Data

(63) Continuation of application No. PCT/CA2014/000430, filed on May 15, 2014.

(60) Provisional application No. 61/823,272, filed on May 14, 2013.

(51) Int. Cl.
| | | |
|---|---|---|
| *B29C 45/64* | (2006.01) | |
| *B29C 45/67* | (2006.01) | |
| *B29C 45/17* | (2006.01) | |

(52) U.S. Cl.
CPC ......... *B29C 45/6728* (2013.01); *B29C 45/1747* (2013.01)

(58) Field of Classification Search
CPC .................................................. B29C 45/6728
See application file for complete search history.

(56) References Cited

U.S. PATENT DOCUMENTS

| 4,874,309 | A | 10/1989 | Kushibe et al. |
|---|---|---|---|
| 5,302,108 | A | 4/1994 | Wohlrab |
| 5,320,517 | A | 6/1994 | Hirata et al. |
| 5,345,766 | A | 9/1994 | Leonhartsberger et al. |
| 7,311,517 | B2 | 12/2007 | Manabe et al. |
| 7,497,678 | B2 | 3/2009 | Glaesener et al. |
| 7,611,346 | B2 | 11/2009 | Schad et al. |
| 7,981,334 | B2 | 7/2011 | Chiang |
| 8,221,670 | B2 | 7/2012 | Schad et al. |
| 2008/0187771 | A1 | 8/2008 | Schad et al. |

FOREIGN PATENT DOCUMENTS

| CA | 2607386 | 4/2009 |
|---|---|---|
| CN | 101600557 | 12/2009 |
| EP | 2444676 | 4/2012 |
| JP | 2005335075 | 12/2005 |
| JP | 2008072113 | 3/2008 |
| WO | 2004024417 | 3/2004 |
| WO | 2008095282 | 8/2008 |

*Primary Examiner* — Jill Heitbrink
(74) *Attorney, Agent, or Firm* — Bereskin & Parr LLP/S.E.N.C.R.L.,s.r.l.

(57) ABSTRACT

A clamp assembly for an injection molding machine includes: (a) a cylinder housing having an inner end and an outer end spaced axially apart from the inner end; (b) a piston assembly comprising a tie bar end portion of a tie bar and a piston head affixed to the tie bar end portion, the piston assembly slidable within the housing between a meshing position and a clamped position spaced axially apart from the meshing position; (c) a clamp chamber between the piston head and the inner end of the cylinder housing for holding pressurized fluid and urging the piston assembly to the clamped position when pressurized; and (d) a spring return device adjacent the outer end of the cylinder housing, the spring return device pushing the piston assembly from the clamped position back to the meshing position when pressure in the clamp chamber is relieved.

20 Claims, 6 Drawing Sheets

US 9,333,691 B2

HIGH SPEED CLAMP SYSTEM FOR AN INJECTION MOLDING MACHINE

This application is a continuation of PCT Application No. PCT/CA2014/000430, filed May 15, 2014, which claims the benefit of Provisional Application Ser. No. 61/823,272, filed May 14, 2013, which is hereby incorporated by reference.

FIELD

The specification relates to injection molding machines, elements thereof, and methods and apparatuses for controlling motion of molds in an injection molding machine.

BACKGROUND

U.S. Pat. No. 4,874,309 (Mitsubishi) purports to disclose in a die clamping apparatus including a fixed die plate, a movable die plate, a device for moving the movable die plate relative to the fixed die plate, a device for fixedly coupling the fixed die plate with the movable die plate and tie bars for carrying out clamping of dies, the tie bars are fixedly secured to the fixed die plate and a hydraulic cylinder having a ram is provided on the movable die plate, or vice versa. The coupling device has a half-nut provided on the surface of the fixed die plate so as to be movable in the axial direction of the tie bar insert hole, and are provided on the outer circumference of the tip end of the tie bar and are adapted to mesh with the half-nut. A stopper is provided between the fixed die plate and the half-nut. A part of the ram is made to butt against the stopper to position the ram in the axial direction of the tie bar insert hole. The end surface of the half-nut opposed to the ram is brought into pressing contact with the ram. At that position, the half-nut can be positioned so as to mate with the threads on the tie bar.

U.S. Pat. No. 5,320,517 (Hirata) purports to disclose a clamping apparatus of molding machine including a base; a fixed board disposed on the base; a movable board movable relative to the fixed board; a plurality of mold clamping cylinders disposed in predetermined positions of the fixed board, the mold clamping cylinders each having a mold clamping piston with a tie bar reception hole and a tie bar connection device disposed on the mold clamping piston; a plurality of tie bars with a thread at their one end, the tie bars being disposed in correspondence with the mold clamping cylinders on the movable board; a plurality of mold opening/closing cylinders for moving the movable board; and an axially movable sleeve associated with each clamping cylinder for adjusting an axial position of an associated piston to adjust an engagement position of the tie bar connection device, the sleeve being disposed in an opening in the fixed board and forming an extension of the tie bar reception hole, with one end of the sleeve abutting against a reception wall provided in each piston surrounding the tie bar reception hole and the other end of the sleeve threadedly cooperating with an engagement adjustment screw ring secured to the fixed board.

U.S. Pat. No. 7,981,334 (Chiang) purports to disclose an injection molding machine and a method for mold-adjusting are provided. The injection molding machine comprises a mold-adjusting mechanism mounted to one side of the fixed platen and being coaxial with the tie bars. Each of the mold-adjusting mechanisms is constructed the same comprising a support frame (11), a motor (12), a mold-adjusting driving wheel (13), a mold-adjusting driven wheel (14), a hydraulic cylinder for positioning (15), a sensor and a control system.

U.S. Pat. No. 7,611,346 (Schad et al.) discloses a clamp actuator of a molding system that includes a first actuator configured to be interactable with a rod; and a second actuator configured to be interactable with the first actuator. The first actuator is configured to apply a clamping force to the rod; and the second actuator is configured to apply a force opposing the clamping force to the first actuator. Responsive to actuating the first actuator, the rod is drivable between (i) a home position in which a clamping force is not applicable to the rod, and (ii) a force application position in which the clamping force is applicable to the rod. Responsive to a mold flash occurring which exceeds the clamping force, the rod is moveable into a mold flash position beyond the home position.

SUMMARY

The following summary is intended to introduce the reader to various aspects of the applicant's teaching, but not to define any invention. In general, disclosed herein are one or more methods or apparatuses related to injection molding, and to closing and clamping a mold of an injection molding machine.

According to some aspects of the present teaching, a clamp assembly for an injection molding machine includes: a cylinder housing having an inner end and an outer end spaced axially apart from the inner end; a piston assembly including a piston head affixed to an end portion of a tie bar, the piston assembly slidable within the housing between a meshing position and a clamped position spaced axially apart from the meshing position, the meshing position corresponding to a first axial position of the piston assembly for interference-free movement of a toothed lock member between locked and unlocked conditions relative to a toothed portion of the tie bar, and the clamped position corresponding to a second axial position of the piston assembly in which a clamp force is exerted by the tie bar across a mold of the injection molding machine; a clamp chamber axially intermediate the piston head and the inner end of the cylinder housing for holding pressurized fluid and urging the piston assembly to the clamped position when pressurized; and a spring return device separate from and axially intermediate the piston assembly and the outer end of the cylinder housing, the spring return device having a return device engagement surface resiliently bearing against the piston assembly, the return device engagement surface moving towards the outer endface of the housing upon movement of the piston assembly to the clamped position when the clamp chamber is pressurized, and the return device engagement surface moving away from the outer end of the housing and pushing the piston assembly from the clamped position back to the meshing position when pressure in the clamp chamber is relieved.

In some examples, the return device engagement surface can be axially moveable relative to the piston assembly. The return device engagement surface can be axially moveable relative to the cylinder housing. The spring return device can be contained inside the cylinder housing.

In some examples, the outer end of the cylinder housing is generally closed off by an end cap, the end cap and piston head axially enclosing a leakage collection reservoir, and the spring return device disposed within the leakage collection reservoir.

In some examples, the return device engagement surface is axially moveable between a return device advanced position when the piston assembly is in the meshing position, and a return device retracted position when the piston assembly is in the clamped position, the return device advanced position being infinitely adjustable over an axial adjustment length to accommodate different mold heights, the axial adjustment length greater than or equal to the spacing between adjacent teeth of the toothed portion of the tie bar.

In some examples, the spring return device includes a plunger having a base directed towards an end cap of the cylinder housing, the return device engagement surface connected to and moveable with the plunger, the plunger translatable between plunger advanced and plunger retracted positions, the plunger advanced position corresponding to the return device advanced position, and the plunger retracted position corresponding to the return device retracted position.

In some examples, the spring return device includes a plurality of springs disposed between the end cap and the plunger, wherein when the clamp chamber is pressurized, the piston assembly pushes the plunger towards the retracted position and compresses the springs, and when pressure in the clamp chamber is relieved, the springs push the plunger to the advanced position and the piston assembly to the meshing position.

In some examples, the clamp assembly further includes a mechanical stop against which the plunger abuts when in the plunger advanced position, the mechanical stop fixed relative to the housing.

In some examples, the mechanical stop includes a keeper affixed to an inner surface of the end cap, the keeper including a stop surface spaced apart from and directed towards the end cap.

In some examples, the plunger includes a catch fixed to the plunger and engaging the stop surface of the keeper when in the advanced position.

In some examples, the plunger includes a plunger body and a plunger sleeve coupled to the plunger body, the plunger sleeve having a sleeve endface protruding from the plunger body towards the piston assembly, the return device engagement surface comprising the sleeve endface.

In some examples, the plunger sleeve is coupled to the plunger body by a threaded connection, the plunger sleeve axially fixable relative to the plunger body in any one of a plurality of axial adjustment positions by rotating the plunger sleeve a selected amount relative to the plunger body.

In some examples, the plunger sleeve is coupled to a rotatable shaft, the plunger sleeve rotationally fixed to rotate with the shaft, the plunger sleeve axially translatable relative to the shaft.

In some examples, the clamp assembly further includes an actuator coupled to the shaft for rotating the shaft by a desired amount to effect axial adjustment of the plunger sleeve relative to the plunger body.

According to some aspects, an injection molding machine, includes a pair of platens; a plurality of tie bars extending between the platens for exerting a mold clamp force; and a respective clamp assembly associated with each tie bar. The actuators of each respective clamp assembly can be coupled together for synchronous adjustment.

According to some aspects, a clamp assembly for an injection molding machine, includes: a cylinder housing having an inner end and an outer end spaced axially apart from the inner end; a piston assembly including a piston head affixed to an end portion of a tie bar, the piston assembly slidable within the housing between a meshing position and a clamped position spaced axially apart from the meshing position, the meshing position corresponding to a first axial position of the piston assembly for interference-free movement of a toothed lock member between locked and unlocked conditions relative to a toothed portion of the tie bar, and the clamped position corresponding to a second axial position of the piston assembly in which a clamp force is exerted by the tie bar across a mold of the injection molding machine; a clamp chamber axially intermediate the piston head and the inner end of the cylinder housing for holding pressurized fluid and urging the piston assembly to the clamped position when pressurized; and a spring return device adjacent the outer end of the cylinder housing, the spring return device resiliently bearing against the piston assembly during normal machine operation, the spring return device yielding to movement of the piston assembly from the meshing position to the clamped position when the clamp chamber is pressurized, and the spring return device pushing the piston assembly from the clamped position back to the meshing position when pressure in the clamp chamber is relieved.

According to some aspects, a method of unclamping and clamping a mold of an injection molding machine, includes: (a) depressurizing a clamp chamber positioned in a cylinder housing on one side of a piston assembly, the piston assembly including a piston head and an end portion of a tie bar; (b) exerting an advancing force on a return device to push the return device from a retracted position to an advanced position, the return device pushing the piston assembly away from a clamped position and into a meshing position when moving into the advanced position, the meshing position corresponding to an axial position of the piston assembly in which first front and first rear abutment surfaces of tie bar teeth fixed to the tie bar are axially spaced apart from corresponding second front and second rear abutment surfaces of lock teeth fixed to a lock member, and the return device, when in the advanced position, (i) bearing against a mechanical stop fixed relative to the cylinder housing, and (ii) contacting the piston assembly; (c) moving a locking member to an unlocked position to unlock the tie bar relative to a first platen; (d) opening the mold, ejecting molded articles from the mold, and closing the mold; (e) moving the locking member to the locked position; (f) exerting a clamping force on the piston assembly to push the piston assembly towards the clamped position, the clamping force greater than the advancing force; (g) reducing the force on the piston assembly from the clamping force to a release force, the release force having a magnitude less than the advancing force; and (h) then repeating steps (a) to (d) for successive cycles of the injection molding machine.

According to some aspects, a method for injection molding articles by repeating successive cycles of an injection molding machine is provided, each cycle including: (a) energizing a traverse actuator in a first direction to advance a moving platen to a closed position relative to a stationary platen, the moving and stationary platens carrying respective moving and stationary portions of a mold, the mold portions touching each other when in the closed position; (b) moving a locking device to a locked position, wherein a first one of the moving and stationary platens is coupled to a tie bar extending from the other, second one of the moving and stationary platens; (c) adding a delta amount of fluid to a clamp chamber in a clamp cylinder housing to increase pressure in the clamp chamber from an unclamp pressure to a clamping pressure, wherein a piston assembly including an end portion of the tie bar and a piston head secured to the end portion of the tie bar is moved from a meshing position to a clamp position, and wherein the tie bar is stretched, and a plunger of a spring return device is pushed from an advanced position to a retracted position, the plunger bearing against the piston assembly when in and moving between the advanced and retracted positions; (d) after step c), injecting melt into the mold portions; (e) after step d), withdrawing the delta amount of fluid from the clamp chamber to reduce the pressure in the clamp chamber from the clamping pressure to the unclamp pressure, wherein the tie bar unstretches and the spring return device moves to the advanced position, pushing the piston assembly back to the meshing position; (f) moving the locking device form the locked position to the unlocked position; (g) energizing the traverse actuator in a second direction opposite the first direction to move the moving platen to an open position spaced apart from the stationary platen and in which the mold portions carried by the moving and stationary platens are spaced apart from each other; and (h) removing the molded articles from the mold. The machine is then ready to execute the cycle again beginning at step a).

In some examples, the system is designed to facilitate keeping the delta amount of fluid to a relatively small amount. This can help reduce oil flow into and out of the chamber, which can help to reduce energy consumption, reduce heat buildup in the oil, and speed the operation of the clamp and unclamp sequence. Moving the piston assembly towards only one side of the meshing position (i.e. towards the clamped position) during normal operation of the machine can help reduce the delta amount. Moving the piston assembly in a direction opposite the clamping direction would displace fluid out of the clamp chamber, and this displaced fluid would need to be replaced for clamp up.

In some examples, the method further includes, after step (f), applying a mold break force for urging the mold portions apart, wherein the position of the piston assembly relative to the clamp cylinder housing remains unchanged by application of the mold break force.

According to some aspects, a clamp assembly for an injection molding machine, includes: (a) a cylinder housing having an inner end and an outer end spaced axially apart from the inner end; (b) a piston assembly comprising a piston head affixed to an end portion of a tie bar, the piston assembly slidable within the housing between a meshing position in which interference-free movement of a toothed lock member between locked and unlocked conditions relative to a toothed portion of the tie bar is accommodated, and a clamped position in which a clamp force is exerted by the tie bar across a mold of the injection molding machine, the clamped position spaced axially apart from the meshing position; (c) a clamp chamber axially intermediate the piston head and the inner end of the housing for holding pressurized fluid and urging the piston assembly to the clamped position when pressurized; (d) a spring return device axially intermediate the piston assembly and the outer end of the housing, the spring return device accommodating movement of the piston assembly from the meshing position to the clamped position when the clamp chamber is pressurized, the spring return device having a return device engagement surface pushing the piston assembly back to the meshing position when pressure in the clamp chamber is relieved; and (e) a stop fixed relative to the housing, the spring return device having a catch spaced apart from the stop when the piston assembly is in the clamped position, and when the return device engagement surface has pushed the piston assembly into the meshing position the catch abuts the stop to limit further axial travel of the return device engagement surface.

a) According to some aspects, a clamp assembly for an injection molding machine includes: (a) a housing having an inner end and an outer end spaced axially apart from the inner end; (b) a piston assembly comprising a piston head affixed to an end portion of a tie bar, the piston assembly slidable within the housing; (c) a clamp chamber axially intermediate the piston head and the inner end of the housing for urging the piston assembly towards the outer end of the housing when pressurized; (d) a spring return device axially intermediate the piston head and the outer end of the housing, the spring return device accommodating movement of the piston assembly from a meshing position towards the outer end of the housing when the clamp chamber is pressurized, the spring return device having a return device engagement surface pushing the piston assembly away from the outer end of the housing and back to the meshing position when pressure in the clamp chamber is relieved; and (e) a stop within the housing for engagement by a catch fixed to the spring return device, the catch engaging the stop when the return device engagement surface is in a return device advanced position to inhibit further axial travel of the return device engagement surface away from the outer end of the housing, the return device advanced position adjustable relative to the housing to axially adjust the meshing position.

According to some aspects, a method of operating a clamp assembly of an injection molding machine includes: (a) pressurizing a clamp chamber to urge a piston assembly affixed to a tie bar from a meshing position towards a clamped position spaced axially apart from the meshing position; (b) compressing springs of a spring return device during movement of the piston assembly towards the clamped position; (c) after steps (a) and (b), relieving pressure in the clamp chamber and allowing the springs to move a return device engagement surface of the spring return device to a return device advanced position in which a catch of the return device abuts a stop to limit further axial movement of the return device engagement surface, the return device engagement surface pushing the piston assembly back to the meshing position during movement to the return device advanced position; (d) repeating steps (a) to (c) during successive machine cycles with a first mold; and (e) after changing the first mold to a second mold, axially adjusting the return device advanced position to adjust the meshing position.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 2a is an enlarged view of a portion of FIG. 2;

FIG. 3a is an enlarged view of a portion of FIG. 3;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
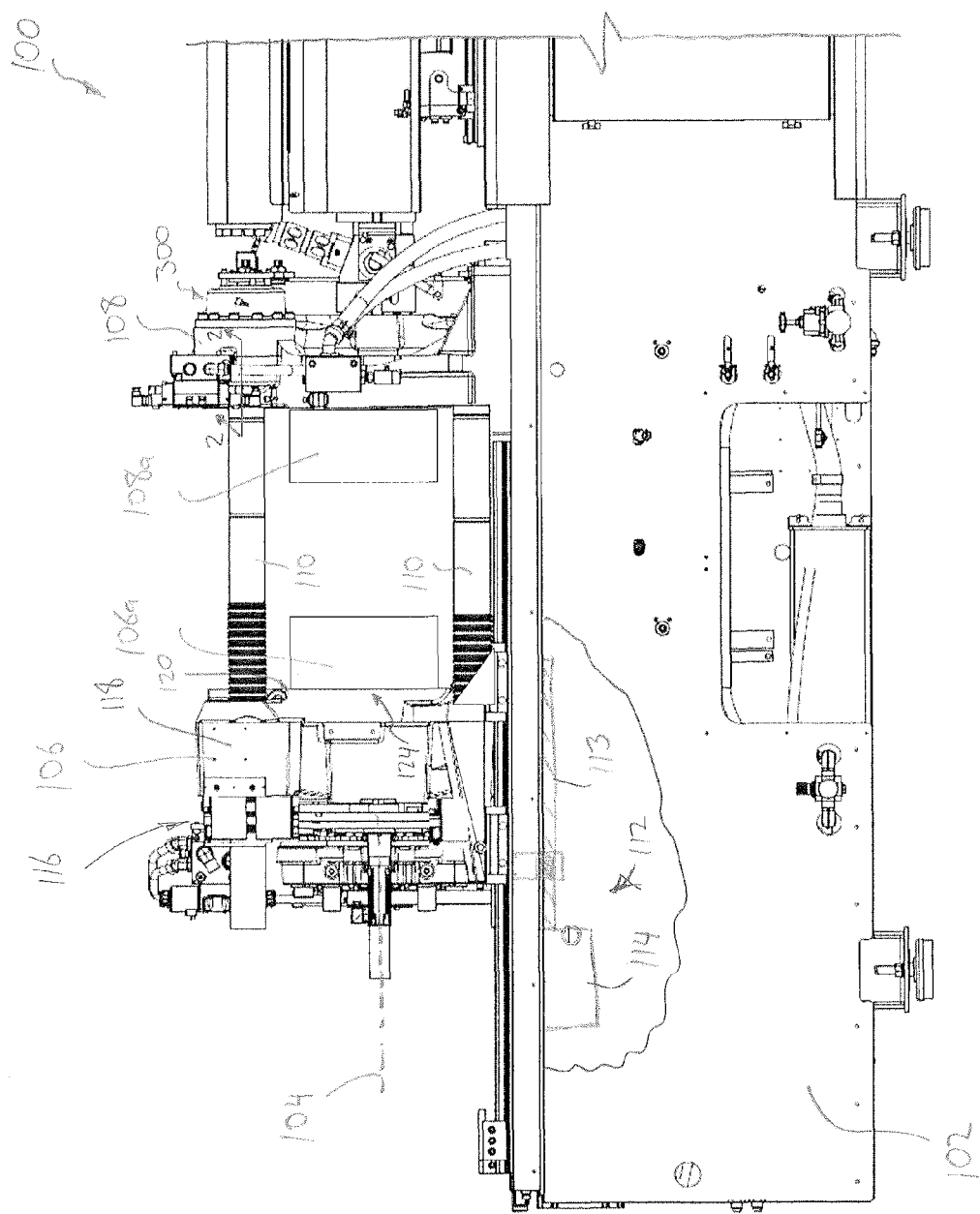
FIG. 1 is a side elevation view of a portion of an injection molding machine.

Referring to FIG. 1, an exemplary injection molding machine 100 includes a machine base 102 that extends lengthwise along a machine axis 104. A pair of platens, including a first platen 106 and a second platen 108, are supported by the machine base 102 for carrying respective mold halves 106a, 108a of a mold. At least one tie bar 110 extends generally between the first and second platens 106, 108 for coupling the platens together exerting a clamp load across the platens when stretched. In the example illustrated, the machine 100 includes four tie bars 110.

In the example illustrated, the first platen 106 is also referred to as a moving platen, and the second platen 108 is also referred to as a stationary platen. The first (moving) platen 106 can translate towards and away from the second (stationary) platen 108 along the machine axis 104 to close and open the mold.

A platen actuator 112 can be coupled to the moving platen 106 for advancing and retracting the moving platen 106 between mold-closed and mold-open positions. In the example shown, the platen actuator 112 includes a first ball screw 113 driven by a first electric motor 114.

Figure 4:
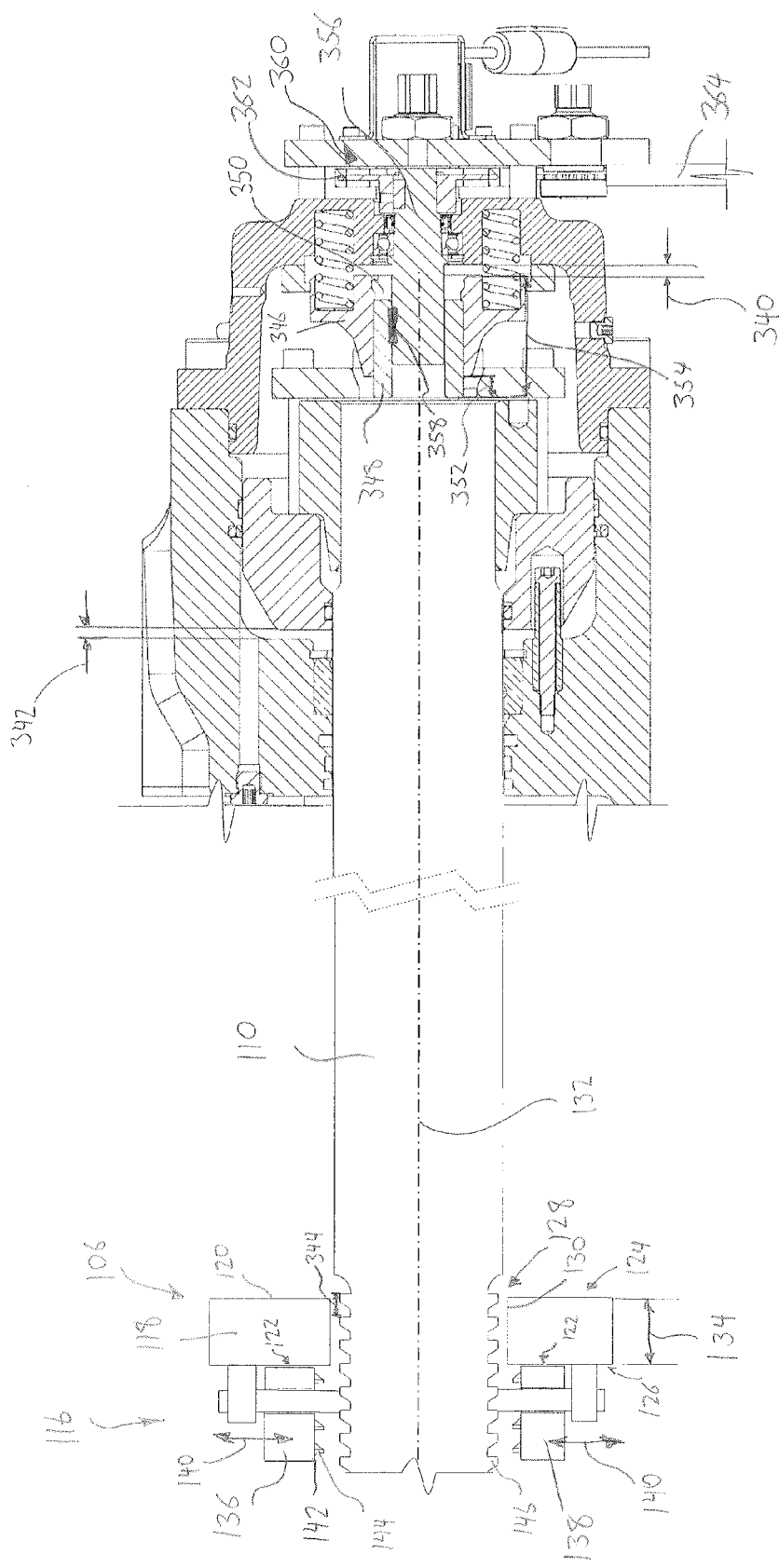
FIG. 4 is the cross-sectional view of FIG. 2 and a schematic representation of a locking assembly in a first position.

The machine 100 further includes a lock assembly 116 for releasably coupling the first platen 106 to a respective one of the tie bars 110 (see also schematic representation in FIG. 4). In the example illustrated, the machine includes four lock assemblies 116, each mounted to the first platen 106 adjacent respective ones of the tie bars 110.

In the example illustrated, the first platen 106 has a platen body 118 with a mold mounting surface 120 for supporting a mold section on a front side 124 of the platen 106 facing the second platen 108, and a plurality of load bearing surfaces 122 (FIG. 4) on the back side 126 of the first platen 106, opposite the front side 124. Each lock assembly 116 is mounted to the back side 124 of the first platen 106, proximate the load bearing surfaces 122.

Referring to schematic FIG. 4, tie bar bores 128 pass through the platen body 118, in respective corners, for receiving a respective tie bar 110. The bores 128 each extend axially along a respective bore axis 132 and are laterally bounded by a bore periphery 130. The bearing surfaces 122 and mold mounting surface 120 are spaced apart from each other by a fixed axial dimension 134 that generally corresponds to an axial thickness of the first platen 106.

Figure 5:
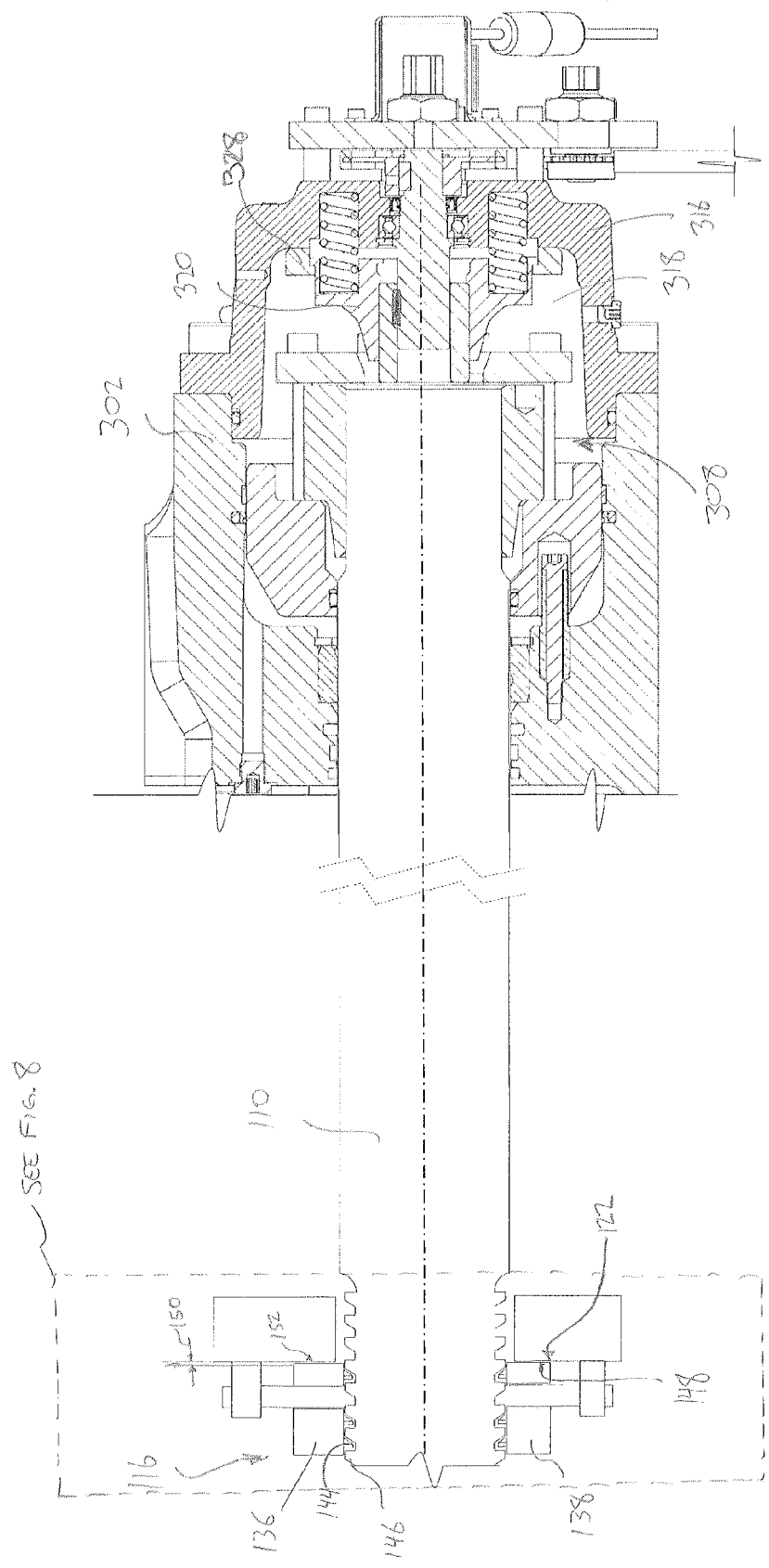
FIG. 5 is the cross-sectional view of FIG. 4 and a schematic representation of a locking assembly in a second position.

Each lock assembly includes, in the example illustrated, first and second lock nut segments 136 and 138 translatable in a transverse direction between locked (see for example FIG. 5) and unlocked (see for example FIG. 4) positions for respectively engaging and disengaging the tie bar 110. The transverse direction is generally perpendicular to the tie bar axis, and, in the example illustrated, the first and second lock nut segments 136 and 138 translate in a vertical direction, as indicated by arrow 140 in FIG. 4, between locked and unlocked positions. In other examples, the lock assembly may comprise a rotary bayonet style locking device, rotatable between locked and unlocked positions.

In the example illustrated, each nut segment 136 and 138 has a tie bar engaging surface 142 directed towards the tie bar 110. The tie bar engaging surface 142 includes nut teeth 144 protruding inwardly from an inner concave surface of the nut segments 136 and 138. When the nut segments 136 and 138 are moved to the locked position (see for example FIG. 5), the nut teeth 144 interengage with tie bar teeth 146 protruding outwardly from the tie bar 110 so that the tie bar 110 and platen 106 are coupled together.

The lock nut segments 136 and 138 can be translated between the locked and unlocked positions using any suitable actuator or mechanism, including, for example, hydraulic and/or pneumatic pistons, mechanism actuators and ball screws.

Figure 2:
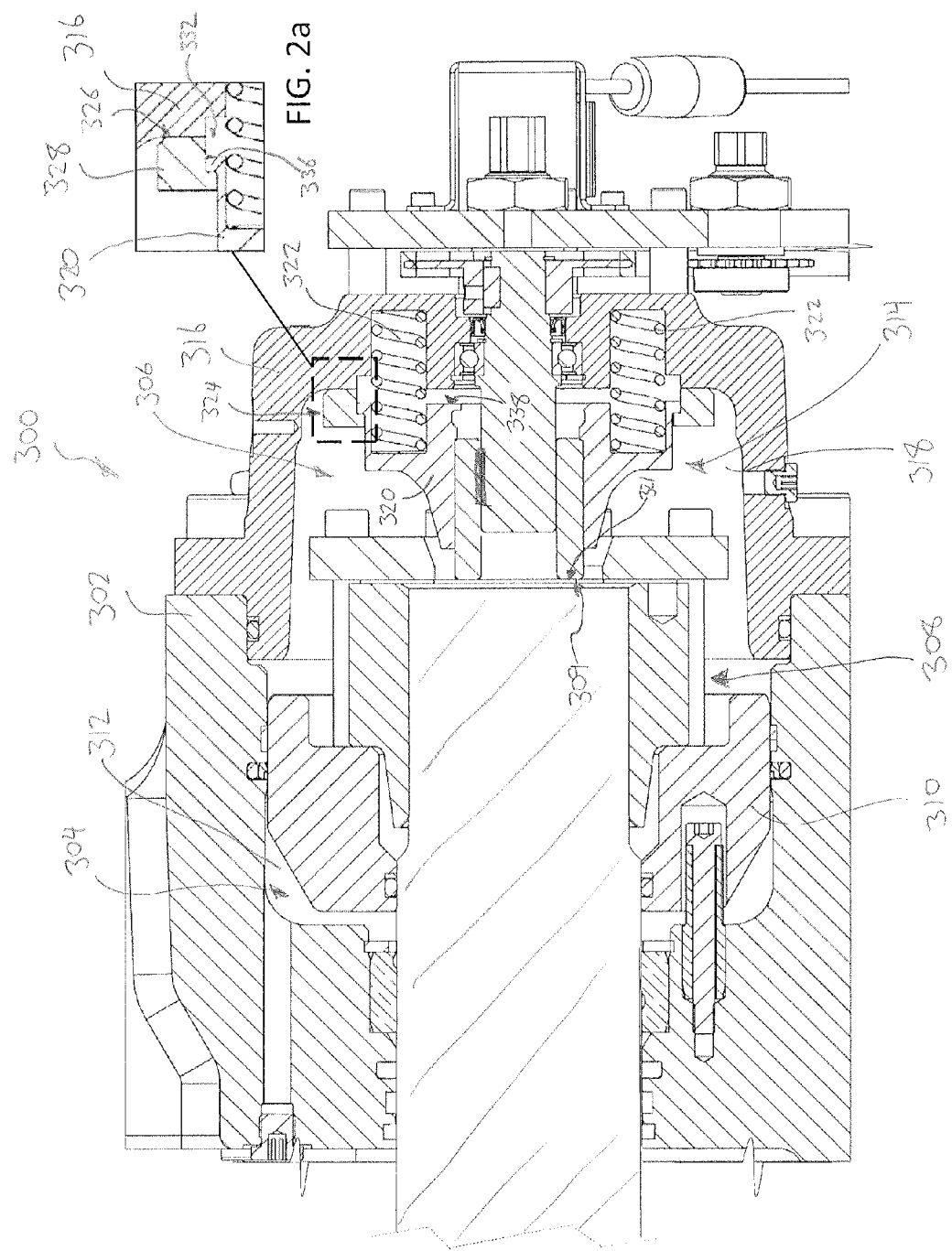
FIG. 2 is a cross-sectional view of a portion of the injection molding machine of FIG. 1, taken along line 2-2.

With reference to FIG. 2, the machine further includes a clamp assembly 300 for applying a clamp load across the mold halves 106a, 108a when in the closed position. In the example illustrated, the machine has four clamp assemblies 300, each associated with a respective one of the tie bars 110.

Each clamp assembly 300 includes a cylinder housing 302 having an inner end 304 and an outer end 306 spaced axially apart from the inner end 304. In the example illustrated, the cylinder housing 302 is affixed to the second (stationary) platen 108, and at least a portion of the cylinder housing 302 can be formed with the body 118 of the platen 108.

Figure 6:
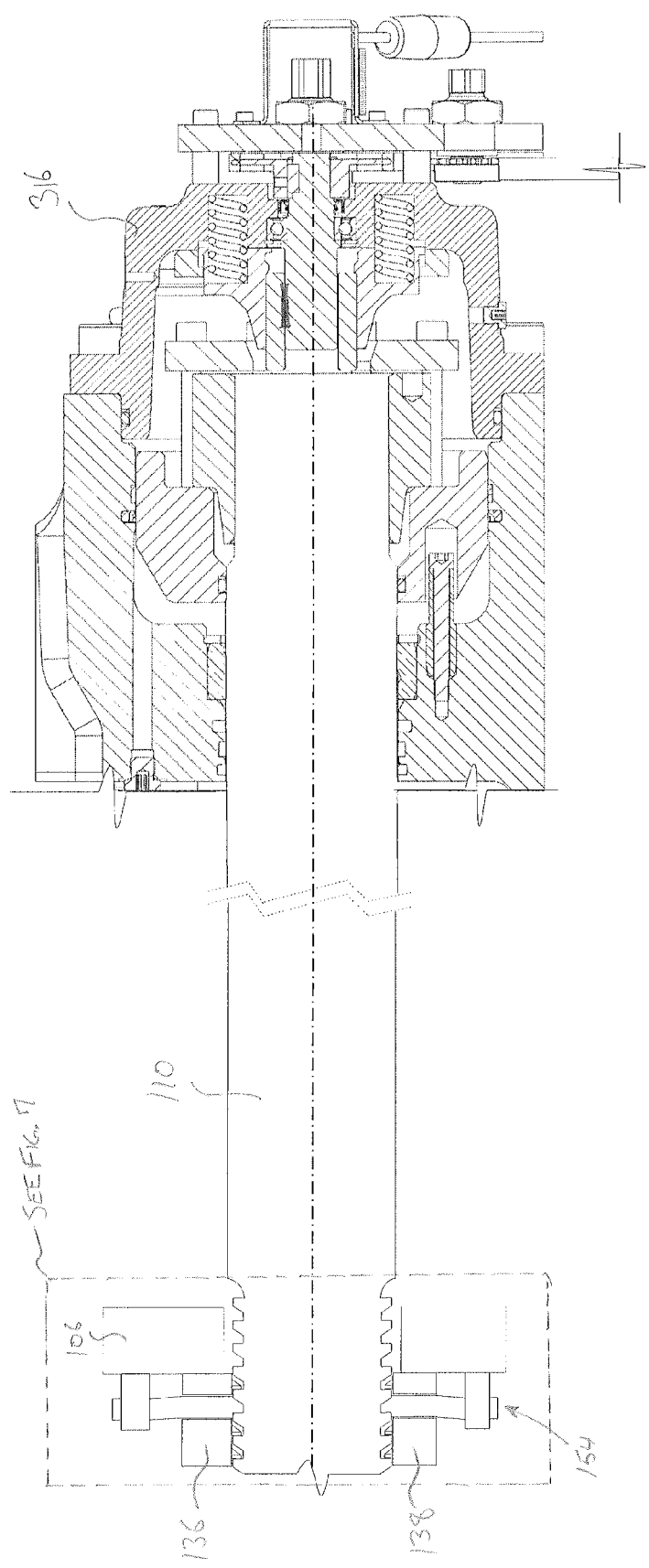
FIG. 6 is the cross-sectional view of FIG. 3 and a schematic representation of a locking assembly in a loaded position.

Each clamp assembly 300 further includes a piston assembly 308 that includes a piston head 310 affixed to an end portion of the tie bar 110. The piston head 310 is slidable within the cylinder housing 302 between a meshing position (FIGS. 2, 4 and 5) and a clamped position (FIGS. 3 and 6) spaced axially apart from the meshing position. The meshing position corresponds to a first axial position of the piston assembly 308 for interference-free movement of the toothed lock member, for example lock nut segments 136 and 138, between the unlocked (FIG. 4) and locked (FIG. 5) conditions relative to the toothed portion of the tie bar 110. The clamped position corresponds to a second axial position of the piston assembly 308 in which a clamp force is exerted by the tie bar 110 across the mold of the injection molding machine 100.

A clamp chamber 312 is provided within the cylinder housing 302, axially intermediate the piston head 310 and the inner end 304 of the cylinder housing 302 for holding pressurized fluid and urging the piston assembly 308 to the clamped position when pressurized.

A spring return device 314 is provided adjacent the outer end 306 of the cylinder housing 302. The spring return device 314 resiliently bears against the piston assembly 308 during normal machine operation. The spring return device 314 yields to movement of the piston assembly 308 from the meshing position to the clamped position when the clamp chamber 312 is pressurized, and the spring return device 314 pushes the piston assembly 308 from the clamped position back to the meshing position when pressure in the clamp chamber 312 is relieved.

In the example illustrated, the spring return device 314 is contained inside the cylinder housing 302. The outer end 306 of the cylinder housing is generally closed off by an end cap 316, and the end cap 316 and piston head 310 axially enclose a leakage collection reservoir 318. In this configuration, the spring return device 314 is disposed within the leakage collection reservoir 318. Oil that is collected in the leakage collection reservoir 318 can beneficially lubricate various components of the spring return device 314. Alternatively, the spring return device 314 may be located in another location, and need not be contained within the leakage collection reservoir 318.

In the example illustrated, the spring return device 314 comprises a plunger 320 translatable between plunger advanced (FIG. 2) and plunger retracted (FIG. 3) positions. The plunger advanced position corresponds to the meshing position of the piston assembly 308, and the plunger retracted position corresponds to the clamped position of the piston assembly 308.

The spring return device 314 further comprises, in the example illustrated, a plurality of springs 322 disposed between the end cap 316 and the plunger 320. When the clamp chamber 312 is pressurized, the piston assembly 308 pushes the plunger 320 towards the retracted position and compresses the springs 322. When pressure in the clamp chamber 312 is relieved, the springs 322 push the plunger 320 to the advanced position and the piston assembly 308 to the meshing position.

Figure 3:
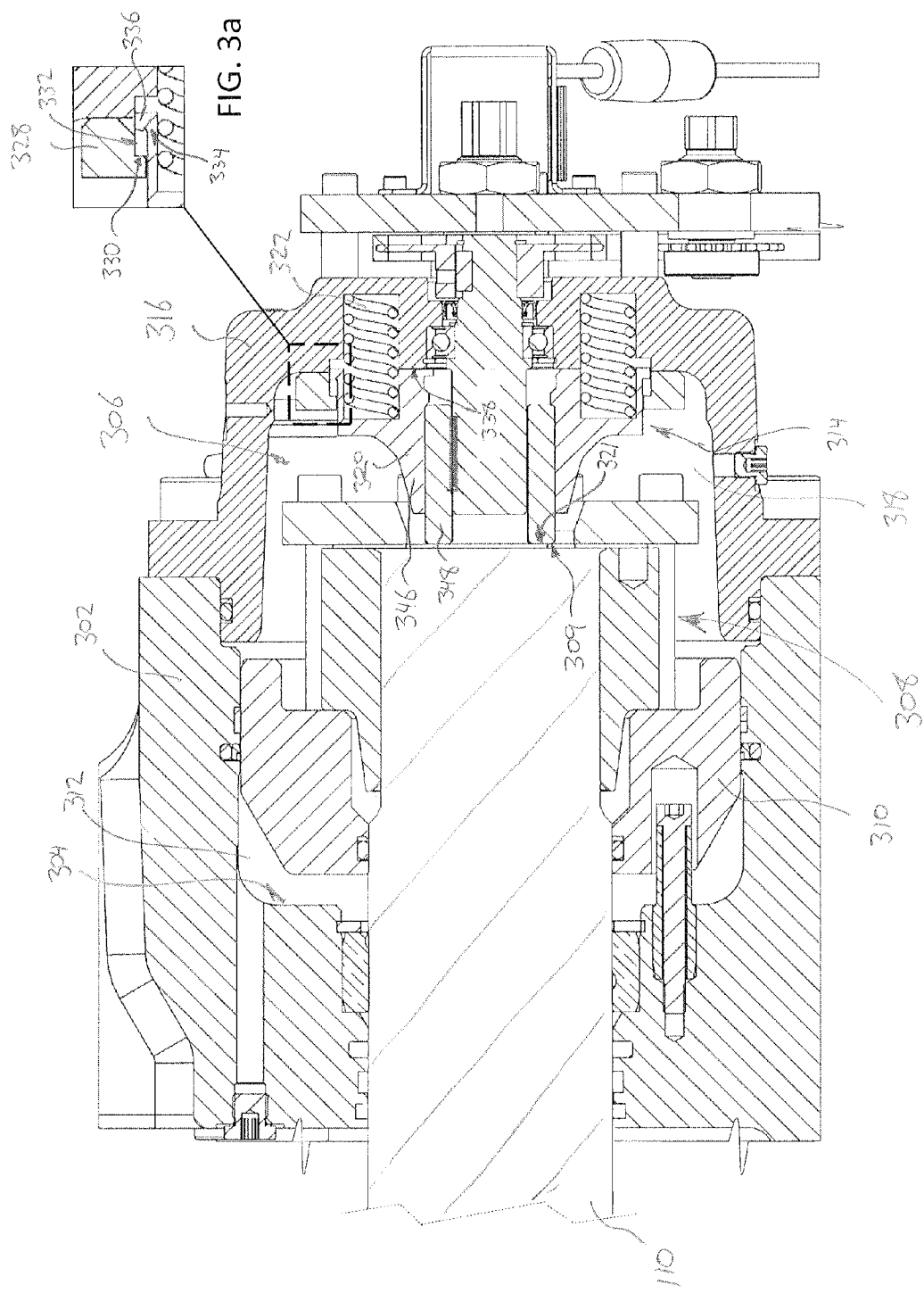
FIG. 3 is the cross-sectional view of FIG. 2 with the clamp assembly energized.

In the example illustrated, a return device engagement surface 321, which is illustrated as an axial endface of the plunger 320, maintains contact with a corresponding piston assembly abutment face 309, which is illustrated as an axial endface of the piston assembly 308, when the piston assembly 308 is in and moves between the meshing position and the clamped position (see FIGS. 2 and 3). In the illustrated example, the piston assembly abutment face 309 comprises the axial endface of the tie bar 110. Alternatively, the piston assembly abutment face 309 may be provided by another member and/or any other portion or surface of the piston assembly 308, and need not form part of the tie bar 110.

In the example illustrated, each respective spring return device 314 is the sole actuator for translating the tie bars 110 in the direction from the clamped position towards the meshing position.

In the illustrated example, the clamp assembly 300 further includes a mechanical stop 324 against which the plunger 320 abuts when in the plunger advanced position. The mechanical stop 324 comprises a keeper 328 affixed to an inner surface 326 (FIG. 2a) of the end cap 316. The keeper 328 includes a stop surface 330 (FIG. 3a) spaced apart from and directed towards the end cap 316. In the example illustrated, the keeper 328 comprises an annular body mounted to an inner surface of the end cap 316 of the housing 302.

Referring to FIG. 3a, the keeper 328 has an undercut 332 extending radially outwardly from an inner surface. The undercut is axially bounded by the stop surface (which is an underside surface of an inwardly projecting flange of the keeper 328 and the end cap 316). The plunger 320 comprises a catch 334 fixed to the plunger 320 that engages the stop surface 330 of the keeper 328 when in the advanced position. The catch 334 can comprise a flange 336 extending radially outwardly from the plunger 320 and protruding into the undercut 332.

The maximum axial travel of the plunger 320 is, in the example illustrated, limited in the retracted direction by the end cap 316 (when engaged by a back surface 338 of the plunger 320—FIGS. 2 and 3), and limited in the advanced direction by the mechanical stop 324 (when engaged by the catch 334). The total maximum available travel of the plunger 320 (stroke limit), represented as distance 340 in FIG. 4, can generally be sized to accommodate stretch of tie bar 110 during clamp-up and displacement of the tie bar 110 to take-up any tooth clearance (spacing between nut teeth 144 and tie bar teeth 146). The stroke limit can also accommodate any gap provide between a bearing surface 122 of the platen 106 and an abutment surface 148 of lock nut segments 136 and 138 of the lock assembly (or any other suitable locking mechanism used). The stroke limit, distance 340, can be in the range of about 1.5 mm to about 12 mm. In the example illustrated, the stroke limit of the plunger 320 is about 5 mm.

Referring to FIG. 4, in the example illustrated, the meshing position of the piston assembly 308 is, relative to the cylinder housing 302, infinitely adjustable over an axial adjustment length to accommodate different mold heights. The axial adjustment length 342 is greater than or equal to the spacing 344 between adjacent tie bar teeth 146 of the toothed portion of the tie bar 110. In some cases the tooth spacing 344 (pitch) can be in the range of about 5 mm to about 18 mm or more. The axial adjustment length 342 can be in a range of about 0%-75% greater than the tooth spacing 344. In the example illustrated, the tooth spacing 344 is about 12 mm, and the axial adjustment length 342 is about 12 mm.

The infinite adjustment can facilitate setting the machine 100 up so that the meshing position corresponds precisely to a mold-closed position of the platens 106 and 108 in which the mold halves 106a and 108a touch each other (zero mold gap). This can help improve cycle time of the machine 100.

Referring to FIG. 4, in the illustrated example, the plunger 320 of the spring return device 314 comprises a plunger body 346 and a plunger sleeve 348 coupled to the plunger body 346. The plunger sleeve 348 is adjustable in any one of a plurality of axial adjustment positions relative to the plunger body 346. Changing the axial position of the sleeve 348 relative to the plunger body 346, for example changing the amount by which the sleeve 348 extends proud of the plunger body 346, can alter the axial position of the endface of the sleeve 348.

In the example illustrated, the sleeve 348 has an axial endface directed towards the piston assembly 308. The axial endface of the sleeve 348 comprises the return device engagement surface 321. Alternatively, in other embodiments the return device engagement surface 321 may be formed as part of the plunger body 346 or any other suitable member that is coupled to the plunger 320 or other portion of the spring return device 314.

In the illustrated example, the sleeve 348 is rotationally fixed to a shaft 356 by a key 358 that is received in corresponding splines in the shaft 356 and sleeve 348. Using a key/spline connection may rotationally fix the sleeve 348 relative to the shaft 356 but may still allow axial translation of the sleeve 348 relative to the shaft 356. The shaft 356 is rotatably mounted in the end cap 316, and is rotatable about the tie bar axis 132. In the illustrated configuration, rotation of the shaft 356 results in corresponding rotation of the sleeve 348.

To facilitate extension and retraction of the sleeve 348 relative to the plunger body 346, the outer surface of the sleeve 348 and the mating, inner surface of the cavity 350 are coupled by a threaded connection. The threaded connection is configured so that rotation of the sleeve 348 relative to the plunger body 346 in one direction results in axial extension of the sleeve 348 relative to the plunger body 346, and rotation of the sleeve 348 relative to the plunger body 346 in the opposite direction causes axial retraction of the sleeve 348 into the cavity 350. The plunger sleeve 348 is axially fixable relative to the plunger body 346 in any one of a plurality of axial adjustment positions by rotating the plunger sleeve 348 a selected amount relative to the plunger body 346.

In the example illustrated, rotation of the shaft 356 causes a corresponding rotation of the sleeve 348, and engagement between the rotating sleeve 348 and the plunger body 346 causes extension and/or retraction of the sleeve 348 within the cavity 350 and axial translation of the sleeve 348 relative to the shaft 356. By rotating the shaft 356, the axial position of the return device engagement surface 321 can be adjusted. The plunger sleeve 348 is coupled to the rotatable shaft 356, such that the plunger sleeve 348 is rotationally fixed to rotate with the shaft 356, and the plunger sleeve 348 is axially translatable relative to the shaft 356.

In the illustrated example, the shaft 356 is generally coaxial with the sleeve 348, and both the sleeve 348 and shaft 356 are generally coaxial with the tie bar 110. Alternatively, one or both of the sleeve 348 and the shaft 356 may be offset from each other and/or from the tie bar 110.

The shaft 356 may be rotated using any suitable means, including, for example by hand, using a hand tool (such as a wrench) and by using an actuator. In the illustrated example, an actuator 360 is coupled to the shaft 356. The actuator 360 includes a sprocket 362 that is mounted to the exposed end of the shaft 356, such that rotation of the sprocket 362 causes corresponding rotation of the shaft 356. The sprocket 362 is driven by a drive belt 364 (or optionally a drive chain or any other suitable mechanism or linkage), which is driven by a suitable motor (e.g. hydraulic or electric) or other drive mechanism.

Optionally, a single drive belt 364, or a combination of two or more drive belts linked together, may be connected to some or all of the sprockets 362 and shafts 356 provided on the platen 108. Providing a drive belt 346 or belt assembly that is linked to all of the shafts 356 may allow for simultaneous, and preferably synchronized, adjustment the plunger 320 associated with each tie bar 110. This may also allow for a single motor to be used to drive all of the shafts 356. Using a single motor may reduce cost and machine complexity.

Optionally, a manual actuator, for example a hand crank, may be connected to the shaft 356 in addition to, or as an alternative to the sprocket 362. Providing a hand crank may allow a user to manually rotate the shaft 356. If the drive belt 346 (or similar linkage) is used in combination with the hand crank, a user may simultaneously adjust all four plunger sleeves 348 by engaging and rotating a single shaft 356. Optionally, the hand crank may be detachable. This may allow the hand crank to be attached when adjustment to the plungers 320 is required, and then detached during normal operation of the machine 100.

While the above description provides examples of one or more processes or apparatuses, it will be appreciated that other processes or apparatuses may be within the scope of the accompanying claims.

The invention claimed is:

1. A clamp assembly for an injection molding machine, comprising:
  a) a cylinder housing having an inner end and an outer end spaced axially apart from the inner end;
  b) a piston assembly comprising a piston head affixed to an end portion of a tie bar, the piston assembly slidable within the housing between a meshing position in which interference-free movement of a toothed lock member between locked and unlocked conditions relative to a toothed portion of the tie bar is accommodated, and a clamped position in which a clamp force is exerted by the tie bar across a mold of the injection molding machine, the clamped position spaced axially apart from the meshing position;
  c) a clamp chamber axially intermediate the piston head and the inner end of the housing for holding pressurized fluid and urging the piston assembly to the clamped position when pressurized;
  d) a spring return device axially intermediate the piston assembly and the outer end of the housing, the spring return device accommodating movement of the piston assembly from the meshing position to the clamped position when the clamp chamber is pressurized, the spring return device having a return device engagement surface pushing the piston assembly back to the meshing position when pressure in the clamp chamber is relieved; and
  e) a stop fixed relative to the housing, the spring return device having a catch spaced apart from the stop when the piston assembly is in the clamped position, and when the return device engagement surface has pushed the piston assembly into the meshing position the catch abuts the stop to limit further axial travel of the return device engagement surface.

2. The clamp assembly of claim 1, wherein the return device engagement surface is axially moveable relative to the piston assembly by an adjustment actuator.

3. The clamp assembly of claim 1, wherein the return device is coupled to an adjustment actuator, and wherein rotation of the adjustment actuator axially moves the return device engagement surface relative to the housing.

4. The clamp assembly of claim 1, wherein the spring return device is contained inside the housing.

5. The clamp assembly of claim 1, wherein the outer end of the housing is generally closed off by an end cap fixed relative to the housing, the end cap and piston head axially enclosing a leakage collection reservoir, and the spring return device disposed within the leakage collection reservoir.

6. The clamp assembly of claim 1, wherein the return device engagement surface is axially moveable between a return device advanced position when the piston assembly is in the meshing position, and a return device retracted position when the piston assembly is in the clamped position, the return device advanced position being infinitely adjustable over an axial adjustment length to accommodate different mold heights, the axial adjustment length greater than or equal to the spacing between adjacent teeth of the toothed portion of the tie bar.

7. The clamp assembly of claim 6, wherein the spring return device comprises a plunger having a base directed towards an end cap of the housing, the return device engagement surface connected to and moveable with the plunger, the plunger translatable between plunger advanced and plunger retracted positions, the plunger advanced position corresponding to the return device advanced position, and the plunger retracted position corresponding to the return device retracted position.

8. The clamp assembly of claim 7, wherein the spring return device comprises a plurality of springs disposed between the end cap and the plunger, wherein when the clamp chamber is pressurized, the piston assembly pushes the plunger towards the retracted position, compressing the springs, and when pressure in the clamp chamber is relieved, the springs push the plunger towards the plunger advanced position, pushing the piston assembly towards the meshing position.

9. The clamp assembly of claim 7, wherein the catch is fixed relative to the plunger, the catch abutting the stop when the plunger is in the plunger advanced position.

10. The clamp assembly of claim 9, wherein the stop comprises a keeper affixed to an inner surface of the end cap, the keeper including a stop surface spaced apart from and directed towards the end cap.

11. The clamp assembly of claim 10, wherein the catch engages the stop surface of the keeper when the plunger is in the plunger advanced position.

12. The clamp assembly of claim 7, wherein the plunger comprises a plunger body and a plunger sleeve coupled to the plunger body, the plunger sleeve having a sleeve endface protruding from the plunger body towards the piston assembly, the return device engagement surface comprising the sleeve endface.

13. The clamp assembly of claim 12, wherein the plunger sleeve is coupled to the plunger body by a threaded connection, the plunger sleeve axially fixable relative to the plunger body in any one of a plurality of axial adjustment positions by rotating the plunger sleeve a selected amount relative to the plunger body.

14. The clamp assembly of claim 13, wherein an outer surface of the plunger sleeve and a mating, inner surface of a cavity of the plunger body are coupled by the threaded connection.

15. The clamp assembly of claim 13, wherein the plunger sleeve is coupled to a rotatable shaft, the plunger sleeve rotationally fixed to rotate with the shaft, and the plunger sleeve axially translatable relative to the shaft.

16. The clamp assembly of claim 15, wherein the shaft is generally coaxial with the plunger sleeve.

17. The clamp assembly of claim 15, further comprising an adjustment actuator coupled to the shaft for rotating the shaft, wherein rotation of the shaft axially moves the plunger sleeve relative to the plunger body.

18. The clamp assembly of claim 1, wherein the return device engagement surface resiliently bears against the piston assembly throughout each cycle of the injection molding machine during normal operation.

19. A clamp assembly for an injection molding machine, comprising:
   a) a housing having an inner end and an outer end spaced axially apart from the inner end;
   b) a piston assembly comprising a piston head affixed to an end portion of a tie bar, the piston assembly slidable within the housing;
   c) a clamp chamber axially intermediate the piston head and the inner end of the housing for urging the piston assembly towards the outer end of the housing when pressurized;
   d) a spring return device axially intermediate the piston head and the outer end of the housing, the spring return device accommodating movement of the piston assembly from a meshing position towards the outer end of the housing when the clamp chamber is pressurized, the spring return device having a return device engagement surface pushing the piston assembly away from the outer end of the housing and back to the meshing position when pressure in the clamp chamber is relieved; and
   e) a stop within the housing for engagement by a catch fixed to the spring return device, the catch engaging the stop when the return device engagement surface is in a return device advanced position to inhibit further axial travel of the return device engagement surface away from the outer end of the housing, the return device advanced position adjustable relative to the housing to axially adjust the meshing position.

20. A method of operating a clamp assembly of an injection molding machine, the method comprising:
   a) pressurizing a clamp chamber to urge a piston assembly affixed to a tie bar from a meshing position towards a clamped position spaced axially apart from the meshing position;
   b) compressing springs of a spring return device during movement of the piston assembly towards the clamped position;
   c) after steps (a) and (b), relieving pressure in the clamp chamber and allowing the springs to move a return device engagement surface of the spring return device to a return device advanced position in which a catch of the return device abuts a stop to limit further axial movement of the return device engagement surface, the return device engagement surface pushing the piston assembly back to the meshing position during movement to the return device advanced position;
   d) repeating steps (a) to (c) during successive machine cycles with a first mold; and
   e) after changing the first mold to a second mold, axially adjusting the return device advanced position to adjust the meshing position.

* * * * *